United States Patent
Ali et al.

(10) Patent No.: US 12,294,329 B2
(45) Date of Patent: May 6, 2025

(54) APPARATUS AND METHOD FOR CALIBRATING MOTOR POSITION OFFSET USING BACK ELECTROMOTIVE FORCE ZERO CROSSING DETECTION

(71) Applicant: HL MANDO CORPORATION, Gyeonggi-do (KR)

(72) Inventors: Awab Ali, Bay City, MI (US); Kade Hudson, Bay City, MI (US); Tomy Sebastian, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 314 days.

(21) Appl. No.: 18/116,816

(22) Filed: Mar. 2, 2023

(65) Prior Publication Data

US 2024/0297600 A1 Sep. 5, 2024

(51) Int. Cl.
*H02P 6/182* (2016.01)
*H02P 6/28* (2016.01)

(52) U.S. Cl.
CPC ............... *H02P 6/182* (2013.01); *H02P 6/28* (2016.02)

(58) Field of Classification Search
CPC ................................. H02P 6/182; H02P 6/28
See application file for complete search history.

(56) References Cited

U.S. PATENT DOCUMENTS

| | | | |
|---|---|---|---|
| 9,515,588 B2 | 12/2016 | Bateman et al. | |
| 2006/0066276 A1* | 3/2006 | Koch | H02H 7/093 318/434 |
| 2012/0229264 A1 | 9/2012 | Company Bosch et al. | |
| 2023/0353071 A1* | 11/2023 | D'Angelo | H02P 27/08 |

* cited by examiner

*Primary Examiner* — Zoheb S Imtiaz
(74) *Attorney, Agent, or Firm* — WOMBLE BOND DICKINSON (US) LLP (57) ABSTRACT

A circuit for calibration a motor position in a motor having multiple phases including first, second, and third phases is electrically connected to a first phase winding and a second phase winding of the motor. The circuit comprises a comparator having first and second inputs; and a plurality of resistors electrically connected between the motor and the comparator, the plurality of resistors comprising: first parallelly-connected resistors and second parallelly-connected resistors which are connected in series and are connected between the first input of the comparator and the first phase winding of the motor, third parallelly-connected resistors and two or more fourth parallelly-connected resistors which are connected in series and are connected between the second input of the comparator and the second phase winding of the motor, and fifth parallelly-connected resistors connected in series with the second parallelly-connected resistors and connected in series with the fourth parallelly-connected resistors.

20 Claims, 5 Drawing Sheets

APPARATUS AND METHOD FOR CALIBRATING MOTOR POSITION OFFSET USING BACK ELECTROMOTIVE FORCE ZERO CROSSING DETECTION

BACKGROUND

The present disclosure generally relates to an electric motor. More specifically, some embodiments of the present disclosure relate to an apparatus, system, method, and circuit for calibrating motor position offset using back electromotive force (back-EMF) zero crossing detection.

Brushless direct current (DC) motors are used in industries such as vehicles, automotive, appliances, aerospace, consumer, medical, industrial automation equipment, instrumentation. The brushless DC motor generally includes a stator with windings and a rotor with permanent magnets responsive to electricity flowing through the windings. The motor is controlled by sequentially energizing the windings with electrical current to produce a rotating magnetic field in the motor. The magnetic field attracts the rotor magnets, which thus follow the rotation of the magnetic field and, therefore, cause the rotor to rotate. Motor phase winding commutation depends on rotational position of the rotor at any given time relative to the phase winding to be energized next.

Precise and accurate measurements of angular positions of a shaft directly or indirectly coupled to an actuator are necessary in many control and monitoring applications. Specially, motor position information, such as information on a position of the rotor of the motor, is crucial for control of the motor. Motor position sensing may be achieved through encoders, Hall effect position sensors, potentiometers, resolvers and rotary variable differential transformers (RVDTs). For example, a Hall effect sensor senses and measures changes in the magnitude and/or direction of the magnetic field generated by a magnet which has been used for sensing the position of the rotor shaft of the motor.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to some exemplary embodiments of the present disclosure, a circuit for controlling a motor having multiple phases including first, second, and third phases is electrically connected to a first phase winding and a second phase winding of the motor. The circuit may comprise a comparator having first and second inputs, and a plurality of resistors connected between the motor and the comparator, the plurality of resistors comprising: two or more first parallelly-connected resistors and two or more second parallelly-connected resistors, wherein the first parallelly-connected resistors are connected in series with the second parallelly-connected resistors, and the first parallelly-connected resistors and the second parallelly-connected resistors are connected between the first input of the comparator and the first phase winding of the motor, and two or more third parallelly-connected resistors and two or more fourth parallelly-connected resistors, wherein the third parallelly-connected resistors are connected in series with the fourth parallelly-connected resistors, and the third parallelly-connected resistors and the fourth parallelly-connected resistors are connected between the second input of the comparator and the second phase winding of the motor. The two or more first parallelly-connected resistors and the two or more second parallelly-connected resistors may be configured to limit a current inputted from the first phase winding of the motor, and the two or more third parallelly-connected resistors and the two or more fourth parallelly-connected resistors may be configured to limit a current inputted from the second phase winding of the motor.

The plurality of resistors connected between the motor and the comparator may further comprise two or more fifth parallelly-connected resistors connected in series with the second parallelly-connected resistors and connected in series with the fourth parallelly-connected resistors. The two or more fifth parallelly-connected resistors may be connected between a first node formed between the first input of the comparator and the two or more second parallelly-connected resistors and a second node formed between the second input of the comparator and the two or more fourth parallelly-connected resistors.

The first input of the comparator may be configured to receive a first voltage, divided from a voltage of the first phase of the motor by the two or more fifth parallelly-connected resistors, and the second input of the comparator may be configured to receive a second voltage, divided from a voltage of the second phase of the motor by the two or more fifth parallelly-connected resistors.

The comparator is configured to output a signal indicating a comparison between a first voltage divided from a voltage of the first phase of the motor, and a second voltage divided from a voltage of the second phase of the motor. Specifically, the comparator may be configured to: compare a first voltage, divided from a voltage of the first phase of the motor by the two or more fifth parallelly-connected resistors, and a second voltage, divided from a voltage of the second phase of the motor by the two or more fifth parallelly-connected resistors; when the first voltage, divided from the voltage of the first phase of the motor by the two or more fifth parallelly-connected resistors, is greater than the second voltage, divided from the voltage of the second phase of the motor by the two or more fifth parallelly-connected resistors, generate an output voltage having a first level; and when the first voltage, divided from the voltage of the first phase of the motor by the two or more fifth parallelly-connected resistors, is less than the second voltage, divided from the voltage of the second phase of the motor by the two or more fifth parallelly-connected resistors, generate an output voltage having a second level different from the first level.

The circuit may further comprise a sixth resistor connected to an output of the comparator and configured to pull up a voltage of a signal of the output indicating a comparison between a first voltage divided from a voltage of the first phase of the motor, and a second voltage divided from a voltage of the second phase of the motor.

The circuit may further comprise a filter capacitor connected to an output of the comparator and configured to filter out from a voltage of a signal of the output indicating a comparison between a first voltage divided from a voltage of the first phase of the motor, and a second voltage divided from a voltage of the second phase of the motor.

The circuit may further comprise a motor position sensor configured to sense a position of the motor; and a controller configured to calibrate the position or speed of the motor, sensed by the motor position sensor, based on an output signal of the comparator indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors. The controller may be configured to calibrate the position of the motor, sensed by the motor position sensor, based on zero crossing of a voltage difference between the first voltage, divided from a voltage of the first phase of the motor by the two or more fifth parallelly-connected resistors, and the second voltage, divided from a voltage of the second phase of the motor by the two or more fifth parallelly-connected resistors. The position of the motor, sensed by the motor position sensor, may be calibrated to a point away from the zero crossing of the voltage difference between the first voltage and the second voltage by a preset value. The controller may be configured to calibrate the position of the motor, sensed by the motor position sensor, based on a point of changing an output voltage of the comparator from the first level to the second level, or from the second level to the first level. The controller may be configured to control the motor or calibrate a position of the motor in response to an output signal of the comparator indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors.

According to certain exemplary embodiments of the present disclosure, a vehicle may comprise: a power source configured to supply power; a motor having multiple phases including first, second, and third phases: an electric control unit (ECU) configured to selectively provide the power to one or more of the first, second, and third phases of the motor; and a circuit electrically connected to a first phase winding and a second phase winding of the motor, the circuit comprising: a comparator having first and second inputs; and a plurality of resistors electrically connected between the motor and the comparator, the plurality of resistors comprising: two or more first parallelly-connected resistors and two or more second parallelly-connected resistors, wherein the first parallelly-connected resistors are connected in series with the second parallelly-connected resistors, and the first parallelly-connected resistors and the second parallelly-connected resistors are connected between the first input of the comparator and the first phase winding of the motor, and two or more third parallelly-connected resistors and two or more fourth parallelly-connected resistors, wherein the third parallelly-connected resistors are connected in series with the fourth parallelly-connected resistors, and the third parallelly-connected resistors and the fourth parallelly-connected resistors are connected between the second input of the comparator and the second phase winding of the motor, wherein the ECU is configured to control the motor in response to an output signal of the comparator. The two or more first parallelly-connected resistors and the two or more second parallelly-connected resistors may be configured to limit a current inputted from the first phase winding of the motor, and the two or more third parallelly-connected resistors and the two or more fourth parallelly-connected resistors may be configured to limit a current inputted from the second phase winding of the motor.

The plurality of resistors connected between the motor and the comparator may further comprise two or more fifth parallelly-connected resistors connected in series with the second parallelly-connected resistors and connected in series with the fourth parallelly-connected resistors. The two or more fifth parallelly-connected resistors are connected between a first node formed between the first input of the comparator and the two or more second parallelly-connected resistors and a second node formed between the second input of the comparator and the two or more fourth parallelly-connected resistors.

The vehicle may further comprise a motor position sensor configured to sense a position or speed of the motor, and the ECU may be configured to calibrate the a position or speed of the motor, sensed by the motor position sensor, based on an output signal of the comparator indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors. The ECU may be configured to calibrate the position or speed of the motor, sensed by the motor position sensor, based on a time point of changing an output voltage of the comparator from the first level to the second level, or from the second level to the first level.

The comparator may be configured to output a signal indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors. Specifically, the comparator is configured to compare a first voltage, divided from a voltage of the first phase of the motor by the two or more fifth parallelly-connected resistors, and a second voltage, divided from a voltage of the second phase of the motor by the two or more fifth parallelly-connected resistors; when the first voltage, divided from the voltage of the first phase of the motor by the two or more fifth parallelly-connected resistors, is greater than the second voltage, divided from the voltage of the second phase of the motor by the two or more fifth parallelly-connected resistors, generate an output voltage having a first level; and when the first voltage, divided from the voltage of the first phase of the motor by the two or more fifth parallelly-connected resistors, is less than the second voltage, divided from the voltage of the second phase of the motor by the two or more fifth parallelly-connected resistors, generate an output voltage having a second level different from the first level.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

After the assembly of a multi-phase motor and a motor position sensor for sensing a position of the motor or during the operation of the multi-phase motor, for example at startup and at other times during operation, a controller controlling the motor may need to calibrate the motor position sensor to precisely detect the position and/or rotation speed of the rotor of the motor. Accurately doing so may allow for precise motor control by adjusting the timing of an applied supply voltage to windings of the motor. Motor position sensors, such as Hall sensors, may be used to detect the position of the rotor of the motor. According to some exemplary embodiments of the present disclosure, the motor position sensor may be calibrated using a back electromotive force (back-EMF) signal to determine a zero crossing event (when the motor crosses a zero point). The "zero crossing" may be where a voltage at a phase winding goes to through zero at a given speed. Back-EMF zero crossing detection can be used to determine the position of the torque generating magnets in the rotor of the motor relative to the stator of the motor at a given point in time. By calculating an offset angle between a position of the motor, estimated based on the back-EMF zero crossing point, and a position of the motor, sensed by the motor position sensor, and correcting the position of the motor sensed by the motor position sensor based on the calculated offset angle, the controller can calibrate the motor position sensor.

Implementations of exemplary embodiments of circuits disclosed herein can calibrate a motor position sensor configured to sense a position of a motor (e.g. a position of a rotor relative to a stator) using detection of a zero crossing point of the back EMF of a multi-phase motor.

Figure 1A:
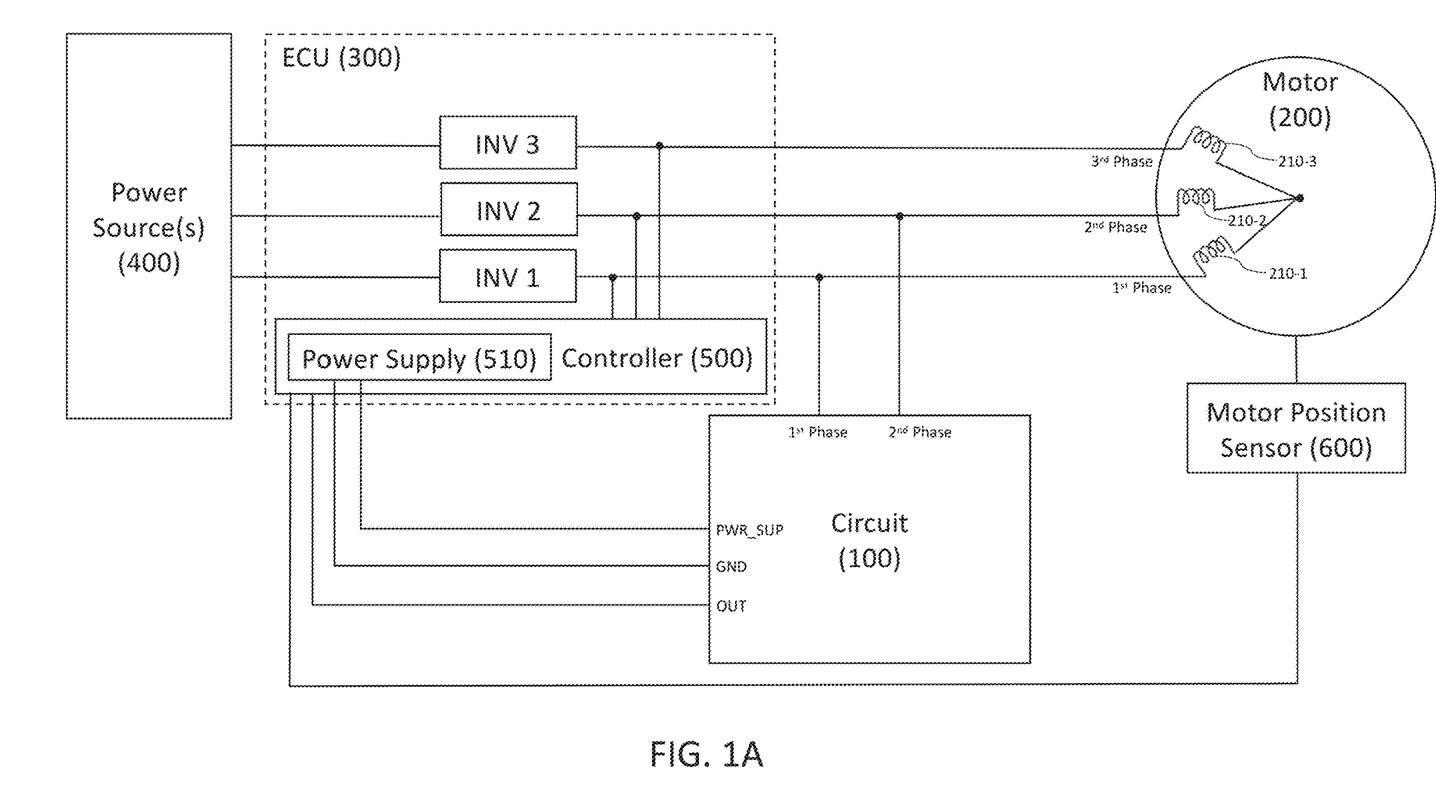
FIG. 1A is a schematic diagram of a motor control system according to an embodiment of the present disclosure.
Figure 1B:
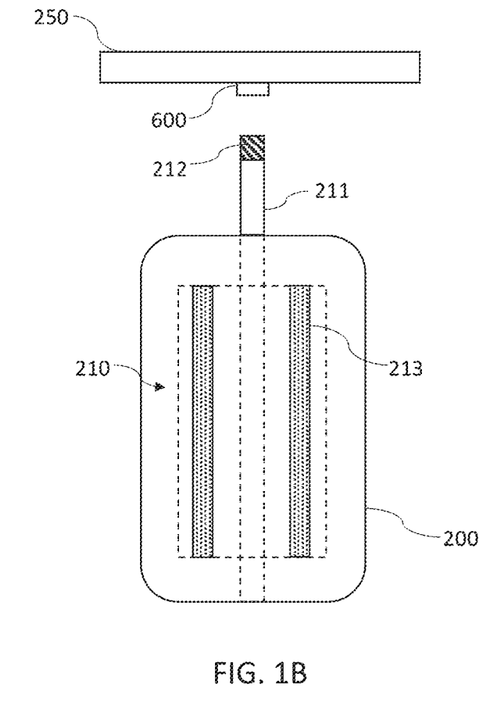
FIG. 1B is a partial schematic diagram for showing arrangement of a motor position sensor and a motor according to an embodiment of the present disclosure.

Referring now to FIGS. 1A and 1B, an implementation of a motor control system comprising a circuit for calibrating a motor position sensor is illustrated.

A motor position sensor 600 may be configured to sense a position and/or speed of the motor 200, for example, but not limited to, a position and/or speed of a rotor 210 of the motor 200. For instance, the position or speed of the motor 200 may mean a relative position or motion between the rotor 210 and the stator of the motor 200 (e.g. a relative position or motion of the rotor 210 with respect to the stator of the motor 200). As illustrated in FIG. 1B, the motor position sensor 600 may be disposed in sensing relationship with the rotor 210 such as a rotatable shaft 211 or a puck magnet 212. For example, the motor position sensor 600 may be positioned adjacent to, or aligned with, the distal end of the rotatable shaft 211 or the puck magnet 212. The motor position sensor 600 is responsive to the rotation of the rotatable shaft 211 or the puck magnet 212. Upon the rotation of the rotatable shaft 211 or the puck magnet 212, the magnetic field generated by the puck magnet 212 mounted to the rotatable shaft 211 will appear to the motor position sensor 600 as a rotating magnetic field that may be used to monitor a rotational position, movement, or status of the rotor 210. The motor position sensor 600 measures the magnetic field generated by the puck magnet 212. The measurements obtained by the motor position sensor 600 are used to calculate, for example, but not limited to, one or more of radial position, rotations per minute (RPM), direction of rotation of the rotor 210 of the motor 200 and the like. The motor position sensor 600 may generate an output signal indicative of the detected or monitored result associated with the rotor 210 of the motor 200 such as magnetic field/flux measurement results, and output the generated output signal to a controller 500. The controller 500 can calculate the radial position, rotations per minute (RPM), direction of rotation of the rotor 210 of the motor 200 based on the output signal of the motor position sensor 600. The motor position sensor 600 can be any suitable device(s) for generating signal responsive to the rotation of the rotor 210 such as the rotatable shaft 211 or the puck magnet 212. For example, the motor position sensor 600 can be an analog or digital type sensor responsive to a magnetic field. The motor position sensor 600 may be, for example, but not limited to, a Hall effect sensor, an encoder, a potentiometer, a resolver, a rotary variable differential transformer (RVDT), a magnetoresisitve (MR) sensor, or any other sensor known in the art with similar capabilities. The motor position sensor 600 can be supported on a printed circuit board 250.

After the motor 200 and the motor position sensor 600 are assembled or arranged in a device, the motor position sensor 600 may require calibration for allowing proper alignment between the position of the motor 200 sensed by the motor position sensor 600 and an actual motor position. Due to manufacturing processes, manufacturing tolerances, environmental influences, and other factors including field serviceability of the sensor, the position of the rotor 210 detected by the motor position sensor 600 may not be perfectly accurate, resulting in a position indication offset or error. For example, during the assembly of the motor 200 and the motor position sensor 600, the position of the motor 200 sensed by the motor position sensor 600 may have an offset caused by initial placement of the puck magnet 212 disposed on the rotatable shaft 211 relative to one or more rotor magnets 213 included in the rotor 210, or an offset caused by the arrangement of the motor position sensor 600 relative to the puck magnet 212. And, the motor position sensor offset error may occur due to aging, rapid acceleration and deceleration operation, and vibration. The motor position sensor offset needs to be precisely measured and be applied in motor control. Accordingly, the motor control system according to an exemplary embodiment of the present disclosure is configured to calibrate the motor position sensor 600 using the Back-EMF zero crossing detection to correct the motor position sensor offset.

One or more power sources 400 may be configured to supply power to an electric control unit (ECU) 300 and/or a circuit 100. The power source 400 may be a direct current (DC) power source or an alternating current (AC) power source, for example, but not limited to, one or more DC batteries, fuel cells, generators, power converters, and the like.

The ECU 300 may have, for example, but not limited to, one or more of a processor, computer or circuit. The ECU 300 may be configured to monitor and physically alter the operating conditions of a motor 200. The ECU 300 may also be configured to accept input and output from a wide array of input and output devices for receiving or sending values.

The ECU 300 may comprise multi-phase (e.g. three-phase) inverters INVs 1 to 3. The inverters INVs 1 to 3 are electrically connected to a respective one of multi-phase motor windings 210-1 to 210-3. Each inverter INV 1 to 3 includes any suitable switching devices, such as insulated-gate bipolar transistors (IGBTs), metal-oxide-semiconductor field-effect transistors (MOSFETs), or any other suitable semiconductor or transistor devices. The inverters INVs 1 to 3 receive the DC power from the power source 400, and convert DC voltages provided from the power source 400 to AC. For example, each inverter INV 1 to 3 includes two or more transistors, and the controller 500 controls the inverters INVs 1 to 3 to provide six pulse width modulation (PWM) outputs that control both the motor rotation direction and speed by turning on and off selected transistors included in the inverters INVs 1 to 3 according to PWM signals appropriately sequenced and timed. The outputs generated by the inverters INVs 1 to 3 are applied to the motor windings 210-1 to 210-3 through the PWM to drive the multi-phase motor 200.

When the ECU 300 is in an active mode, the ECU 300 may be configured to selectively apply phase voltages to one or more of the motor windings 210-1 to 210-3, thereby causing phase currents to flow through the motor windings 210-1 to 210-3 to energize the motor windings 210-1 to 210-3. Even when the ECU 300 is in an inactive mode, rotation of the rotor of the motor 200 can produce back-EMF voltages in the phase windings 210-1 to 210-3.

The controller 500 can include any suitable device, circuits, software, and/or the like for receiving detected phase voltages, determining change rate and commutation time of the phase voltages, further processing such information, and outputting selection signals to the inverters INVs 1 to 3. For instance, the controller 500 can include a processor configured to execute control logic that provides at least some of the functionality for the phase switching, for example, but not limited to, commutating logic and/or circuits, which produce output signals for triggering the inverters INVs 1 to 3 depending on the detected instantaneous rotor position of the motor 200 to thereby commutate the phase windings 210-1, 210-2, 210-3 of the motor 200. The controller 500 may encompass one or more processing units, microprocessors, micro-controllers, discrete logic circuit(s) having logic gates for implementing logic functions upon data signals, application specific integrated circuits (ASIC) with suitable logic gates, complex programmable logic devices (CPLD), programmable or field-programmable gate arrays (PGA/FPGA), any combinations of the aforementioned, and the like. The controller 500 may be interfaced with any suitable memory, which can include any medium configured to provide at least temporary storage of data and/or software or instructions that provide at least some of the functionality of the switching and that may be executed by the controller 500. The controller 500 may also include any other suitable devices or modules, such as ancillary devices like clocks, power supplies, and the like. Although the controller 500 is included in the ECU 300 in an exemplary embodiment of FIG. 1, the controller 500 may be included in the circuit 100 or in both the ECU 300 and the circuit 100, or be arranged outside of the ECU 300 or the circuit 100 as a separate component.

The motor 200 may be a multi-phase motor comprising a plurality of motor windings, for example, but not limited to, a three-phase brushless direct current (BLDC) motor. In the present embodiment, the motor 210 may be a three-phase motor having a first phase motor winding 210-1, a second phase motor winding 210-2, and a third phase motor winding 210-3, and the plurality of the motor windings 210-1 to 210-3 are electrically connected to a respective one of the inverters INVs 1 to 3. However, it should be appreciated that embodiments of the present disclosure should not be limited to such. One having ordinary skill in the art would understand that the present disclosure can be implemented with a two-phase motor or a more than three phase motor.

Under normal operating conditions, the motor 200 is powered by the power source 400 through the ECU 300, for example, the plurality of transistors, included in the inverters INVs 1 to 3. The ECU 300 is configured or operated such that, it injects multiphase sinusoidal currents into the motor windings 210-1 to 210-3 with respect the motor position.

During the calibration process, the motor 200 may be rotated to create the back EMF, and the ECU 300 may be in a passive state in which the inverters INVs 1 to 3 are turned off. The rotation of the motor can be achieved either by an external drive or force or by using the ECU 300 to run the motor 200 at certain speed and then put the ECU 300 in the passive state to start the calibration process.

Figure 2:
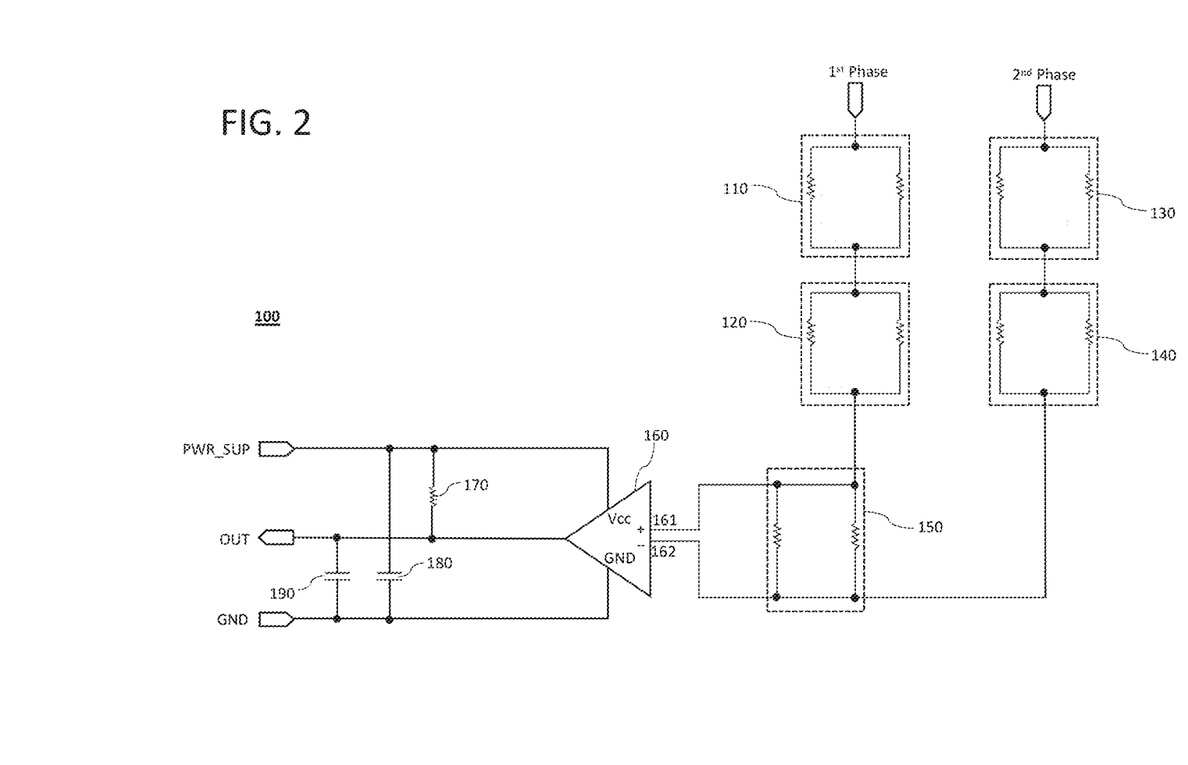
FIG. 2 is a conceptual circuit diagram of a circuit for calibrating a motor position sensor according to an embodiment of the present disclosure.

Referring to FIG. 2, an implementation of the circuit 100 according to an exemplary embodiment of the present disclosure is illustrated.

In the exemplary embodiment of FIG. 2, only two phases of the motor 200, for example, the first and second phases of the motor 200, are electrically connected to the circuit 100, and the remaining other phase of the motor 200 may not be electrically connected to the circuit 100. By using voltages or currents of two phases of the motor 200 connected to the circuit 100, a voltage or current of the remaining phase of the motor 200 can be estimated.

A first phase current (e.g. U phase current) is fed through one or more first resistors 110 and one or more second resistors 120 to a first input (e.g. a positive input terminal) 161 of a comparator 160, and a second phase current (e.g. V phase current) is fed through one or more third resistors 130 and one or more fourth resistors 140 to a second input (e.g. a negative input terminal) 162 of the comparator 160.

One or more first resistors 110 and one or more second resistors 120 are configured to limit the first phase current flowing into the first input 161 of the comparator 160 from the first phase winding 210-1 of the motor 200.

For example, two or more first resistors 110 can be parallelly connected to each other, and two or more second resistors 110 can be parallelly connected to each other so that no single open in one of the parallelly-connected first resistors 110 or one of the parallelly-connected second resistors 120 can cause high voltage at the first input 161 of the comparator 160. If only one resistor is connected between the first phase of the motor 200 and the first input 161 of the comparator 160 and that one resistor gets open circuited, high motor phase voltage such as 800V can be directly fed into the comparator 160, thereby causing the comparator 160 to be damaged. However, according to some embodiments of the present disclosure, by having the plurality of the parallelly-connected first resistors 110 and the plurality of the parallelly-connected second resistors 120, even when one of the parallelly-connected first resistors 110 and/or one of the plurality of the parallelly-connected second resistors 120 become open circuited, the other remaining one of the parallelly-connected first resistors 110 and/or the other remaining one of the plurality of the parallelly-connected second resistors 120 can limit the first phase current flowing into the first input 161 of the comparator 160 or can reduce the first phase voltage provided to the first input 161 of the comparator 160, such that the damage to the comparator 150 caused by direct supply of high motor phase voltage can be prevented.

Further, the parallelly-connected first resistors 110 and the parallelly-connected second resistors 120 are connected in series so that no single short in the parallelly-connected first resistors 110 or the parallelly-connected second resistors 120 can cause high voltage at the first input 161 of the comparator 160. If only one single set of two parallelly-connected resistors is connected between the first phase of the motor 200 and the first input 161 of the comparator 160 and these parallelly-connected resistors of only one single set get short circuited, high motor phase voltage such as 800V can be directly fed into the comparator 160, thereby causing the comparator 160 to be damaged. However, according to certain embodiments of the present disclosure, by having the series connection combination of two or more sets of parallelly-connected resistors, for example, the series connection of the parallelly-connected first resistors 110 and the parallelly-connected second resistors 120, even when one set of a first set of the parallelly-connected first resistors 110 and a second set of the parallelly-connected second resistors 120 is short circuited, the other remaining one set of the first set of the parallelly-connected first resistors 110 and the second set of the parallelly-connected second resistors 120 can limit the first phase current flowing into the first input 161 of the comparator 160 or can reduce the first phase voltage provided to the first input 161 of the comparator 160, such that the damage to the comparator 150 caused by direct supply of high motor phase voltage can be prevented.

One or more third resistors 130 and one or more fourth resistors 140 are configured to limit the second phase current flowing into the second input 162 of the comparator 160. For instance, two or more third resistors 130 can be parallelly connected to each other, and two or more fourth resistors 140 can be parallelly connected to each other so that no single open in one of the parallelly-connected third resistors 130 or one of the parallelly-connected fourth resistors 140 can cause high voltage at the second input 162 of the comparator 160. If only one resistor is connected between the second phase of the motor 200 and the second input 162 of the comparator 160 and that one resistor gets open circuited, high motor phase voltage such as 800V can be directly fed into the comparator 160, thereby causing the comparator 160 to be damaged. However, according to certain embodiments of the present disclosure, by having the plurality of the parallelly-connected third resistors 130 and the plurality of the parallelly-connected fourth resistors 140, even when one of the parallelly-connected third resistors 130 and/or one of the plurality of the parallelly-connected fourth resistors 140 becomes open circuited, the other remaining one of the parallelly-connected third resistors 130 and/or the other remaining one of the plurality of the parallelly-connected fourth resistors 140 can limit the second phase current flowing into the second input 162 of the comparator 160 or can reduce the second phase voltage provided to the second input 162 of the comparator 160, such that the damage to the comparator 150 caused by direct supply of high motor phase voltage can be prevented.

Further, the parallelly-connected third resistors 130 and the parallelly-connected fourth resistors 140 are connected in series so that no single short in the parallelly-connected third resistors 130 or the parallelly-connected fourth resistors 140 can cause high voltage at the second input 162 of the comparator 160. If only one single set of two parallelly-connected resistors is connected between the second phase of the motor 200 and the second input 162 of the comparator 160 and these parallelly-connected resistors of only one single set get short circuited, high motor phase voltage such as 800V can be directly fed into the comparator 160, thereby causing the comparator 160 to be damaged. However, according to certain embodiments of the present disclosure, by having the series connection combination of two or more sets of parallelly-connected resistors, for example, the series connection of the parallelly-connected third resistors 130 and the parallelly-connected fourth resistors 140, even when one set of a first set of the parallelly-connected third resistors 130 and a second set of the parallelly-connected fourth resistors 140 is short circuited, the other remaining one set of a first set of the parallelly-connected third resistors 130 and a second set of the parallelly-connected fourth resistors 140 can limit the second phase current flowing into the second input 161 of the comparator 160 or can reduce the second phase voltage provided to the second input 162 of the comparator 160, such that the damage to the comparator 150 caused by direct supply of high motor phase voltage can be prevented.

One or more fifth resistors 150 are connected between the first input 161 of the comparator 160 and the second input 162 of the comparator 160. The fifth resistors 150 in association with the first, second, third, and forth resistors 110, 120, 130, and 140 are used to attenuate the first phase voltage and the second phase voltage to lower voltages for use by the comparator 160. In other words, the first to fifth resistors 110 to 150 may form one or more voltage dividers. For example, the parallelly-connected fifths resistors 150 may be connected in series with the parallelly-connected first resistors 110 and the parallelly-connected second resistors 120 to divide the first phase voltage so that the divided and/or reduced voltage of the first phase can be inputted the first input 161 of the comparator 160. And, the parallelly-connected fifths resistors 150 may be connected in series with the parallelly-connected third resistors 130 and the parallelly-connected fourth resistors 120 to divide the second phase voltage so that the divided and/or reduced voltage of the second phase can be inputted the second input 162 of the comparator 160. The divided and/or reduced voltages may be set to voltages, such as 5V or 3V, which are within a voltage manageable by the comparator 160.

The arrangement and/or combination of first to fifth resistors 110 to 150 described above can protect the comparator 160, the ECU 300, and the controller 500 from excessive transient and normal operation voltages generated from the motor 200. The parallel arrangement and/or combination between the parallelly-connected first resistors 110, between the parallelly-connected second resistors 120, between the parallelly-connected third resistors 130, between the parallelly-connected fourth resistors 140, and between the parallelly-connected fifth resistors 150, and the series arrangements and/or combinations between the first resistors 110 and the second resistors 120 and between the third resistors 130 and the fourth resistors 140 can protect the comparator 160, the ECU 300, and the controller 500 from an open or short circuited condition caused by failures in one or more resistors included in the circuit 100.

The values of the resistors 110 to 150 can be identical to or different from each other, and can be selected to generate an appropriate voltage output during detection of the position and/or of the motor 200. And, the values of the resistors 110 to 150 may be sized to survive or not to cause to damage the motor 200 at the maximum speed of the motor 200 during normal operation. For instance, the resistance of the first, second, third and fourth resistors 110, 120, 130, 140 may be 1.8 MΩ and the resistance of the fifth resistors 150 may be 1.8 kΩ, although it is not required. Those skilled in the art will recognize that the resistor values can be chosen on a case-by-case basis depending on motor specifications and the like.

The comparator 160 may be configured to compare the divided and/or reduced voltage of the first phase with the divided and/or reduced voltage of the second phase. The comparator 160 may be a device configured to compare two voltages or currents and output a signal associated with comparison result thereof. The comparator 160 may comprise, for example, but not limited to, a differential amplifier or an operational amplifier.

The comparator 160 may have the first input (e.g. a positive input terminal) 161 and the second input (e.g. a negative input terminal) 162. The first input 161 of the comparator 160 is configured to receive the voltage of the first phase divided and/or reduced by the first, second, and fifth resistors 110, 120, 150, and the second input 162 of the comparator 160 is configured to receive the voltage of the second phase divided and/or reduced by the third, fourth, and fifth resistors 130, 140, 150. When the divided and/or reduced voltage of the first phase is greater than or equal to the divided and/or reduced voltage of the second phase, an output signal of the comparator 160 is at a logic high ("1") such as 3V or 5V. When the divided and/or reduced voltage of the first phase is less than the divided and/or reduced voltage of the second phase, an output signal of the comparator 160 is at a logic low ("0"). Examples of back-EMF voltages of the first and second phases inputted into the first and second inputs 161 and 162 of the comparator 160, respectively, and an output signal OUT outputted from the comparator 160 in response to the back-EMF voltages of the first and second phases inputted into the first and second inputs 161 and 162 of the comparator 160 are illustrated in FIG. 3.

The controller 500 may determine a position or speed of the rotor of the motor 200 based on the output signal OUT of the comparator 160 indicating comparison result between the first motor phase voltage and the second motor phase voltage. The comparison result of the voltage of the first motor phase with the voltage of the second motor phase has relationship with the position of the rotor of the motor 200. Accordingly, by comparing the voltage of the first motor phase with the voltage of the second motor phase, the zero crossing information of the back-EMF of the motor 200 can be obtained. For example, the back-EMF zero crossing event of the first motor phase is detected after 30 electrical degrees time from a time point of changing the output signal OUT of the comparator 160 from the logic low to the logic high or from the logic high to the logic low, the back-EMF zero crossing event of the second motor phase is detected after 30 electrical degrees time from the a time point of changing the output signal OUT of the comparator 160 from the logic low to the logic high or from the logic high to the logic low, and the back-EMF zero crossing event of the third motor phase is detected after 90 electrical degrees time from a time point of changing the output signal OUT of the comparator 160 from the logic low to the logic high or from the logic high to the logic low. This back-EMF zero-crossing decoding performed by the controller 500 can be carried out by any suitable zero-cross decoding logic which is generally known to those of skill in the art.

The controller 500 receives the output signal OUT of the comparator 160, determines the back-EMF zero crossing point of the motor 200, estimates the operating position of the motor 200 based on the determined back-EMF zero crossing point, compares the operating position of the motor 200, estimated based on the determined back-EMF zero crossing point, with the position of the motor 200, sensed by the motor position sensor 600, and calibrates the motor position sensor 600 using an offset angle between the operating position of the motor 200, estimated based on the determined back-EMF zero crossing point, and the position of the motor 200, sensed by the motor position sensor 600. For example, the offset angle between the operating position and/or speed of the motor 200, estimated based on the determined back-EMF zero crossing point, and the position of the motor 200, sensed by the motor position sensor 600, is calculated, and this offset angle can be used to correct the position of the motor 200, sensed by the motor position sensor 600, in order to calibrate the motor position sensor 600. By synchronizing the position of the motor 200, sensed by the motor position sensor 600, with the operating position and/or speed of the motor 200, estimated based on the determined back-EMF zero crossing point, the motor position sensor 600 can be calibrated.

Figure 3:
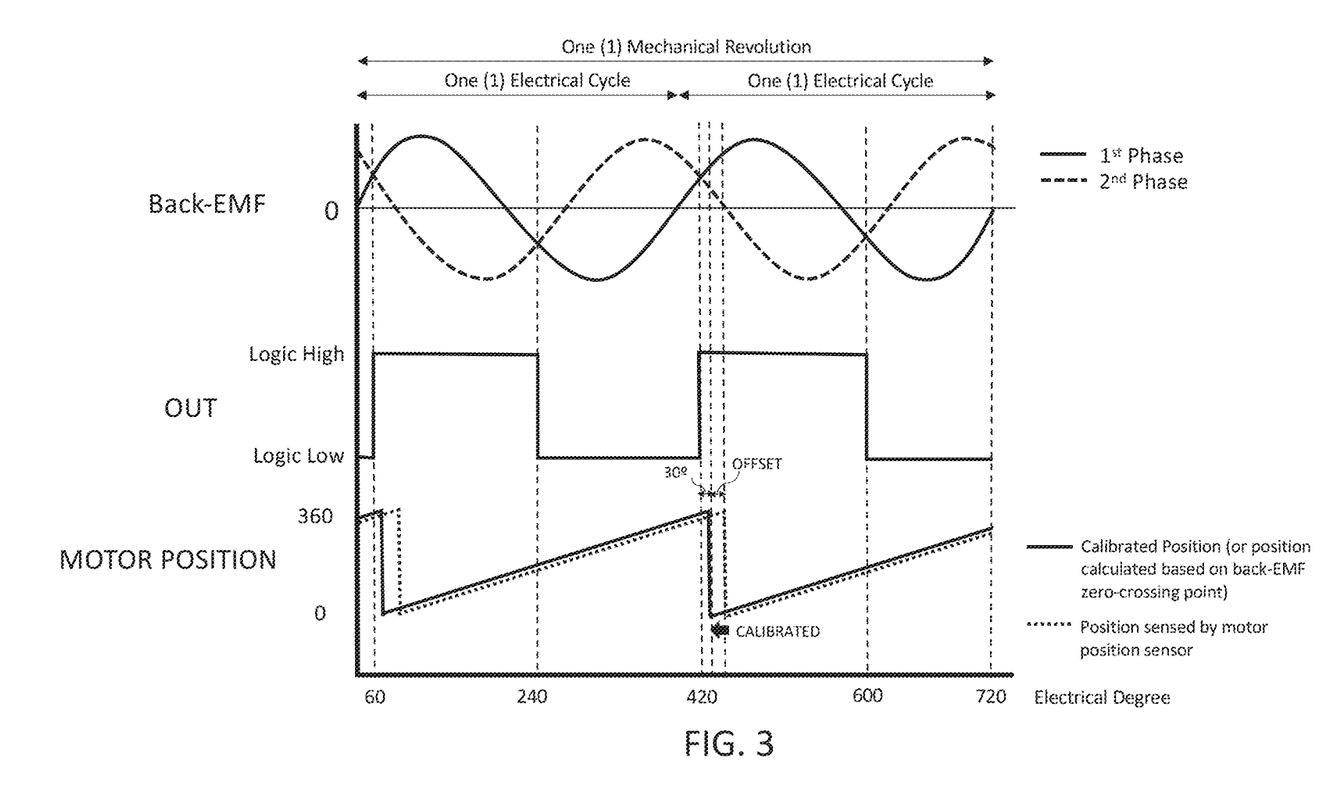
FIG. 3 is graphs for illustrating examples of back-EMF voltage inputs of first and second phases of a motor, an output of a comparator, and signals indicative of motor positions according to an embodiment of the present disclosure.

In an exemplary embodiment illustrated in FIG. 3, a reference motor position '0' can be calculated at an electrical degree time after 30 electrical degree time from a time point of changing the output signal OUT of the comparator 160 from the logic low to the logic high (i.e. the back-EMF zero crossing point), an offset between this reference motor position '0' calculated based on the back-EMF zero crossing point while changing the output signal OUT of the comparator 160 from the logic low to the logic high and a reference motor position '0' sensed by the motor position sensor 600 is calculated, and the motor position sensor 600 is calibrated with the offset as illustrated in FIG. 3.

The position sensor calibration procedure may be carried out after position sensor assembly (end of line approach), with every start-up and/or shut-down of the vehicle, and/or during the operation of the vehicle. For instance, after the motor position sensor 600 or the ECU of in-wheel propulsion is replaced or serviced, the ECU motor position offset can be re-calibrated according to certain embodiments of the present disclosure. This procedure is necessary to ensure motor efficiency and to produce the commanded position, speed, and torque with the highest possible accuracy. Accordingly, the circuit 100 can calibrate the motor position sensor 600 by sensing the zero crossing of an AC signal produced by the back-EMF from the motor 200. Some exemplary embodiments of the present disclosure can provide automated calibration which can reduce cost in many areas by removing manufacturing tolerances, allowing the use of less expensive components, reducing test time, improving reliability, increasing customer satisfaction, reducing customer returns, lowering warranty costs, and increasing the speed of product delivery. Furthermore, the calibration according to certain exemplary embodiments of the present disclosure can improve motor control performance to achieve desired output torque and power level and assure robust controllability.

The circuit 100 according to some embodiments of the present disclosure may not affect the normal operation (e.g. an active state) of the motor 200.

The circuit 100 may further comprise a sixth resistor 170 connected to the output of the comparator 160. For example, the six resistor 170 can be connected between the output of the comparator 160 and a power supply terminal Vcc of the comparator 160. The sixth resistor 170 may be configured to pull up a voltage of an output signal OUT of the comparator 160 indicating a comparison result between the voltage of the first motor phase and the voltage of the second motor phase in order to provide an appropriate voltage of the output signal OUT of the comparator 160 for the ECU 300.

A decoupling capacitor 180 for the comparator 160 may be included to reduce noise. For instance, the decoupling capacitor 180 may be coupled between the ground terminal GND and the power supply terminal Vcc of the comparator 160.

A filter capacitor 190 connected to the output of the comparator 160 may be included in the circuit 100. For example, the filter capacitor 190 may be coupled between the ground GND and the output of the comparator 160. The filter capacitor 190 may be configured to filter out from a voltage of the output signal of the comparator 160.

Although the ground terminal GND and the power supply terminal PWR_SUP of the circuit 100 are coupled to the controller 500 in the exemplary embodiment of FIG. 2, either or both of the ground terminal GND and the power supply terminal PWR_SUP of the circuit 100 can be connected to a power supply 501 included in the controller 500.

Figure 4:
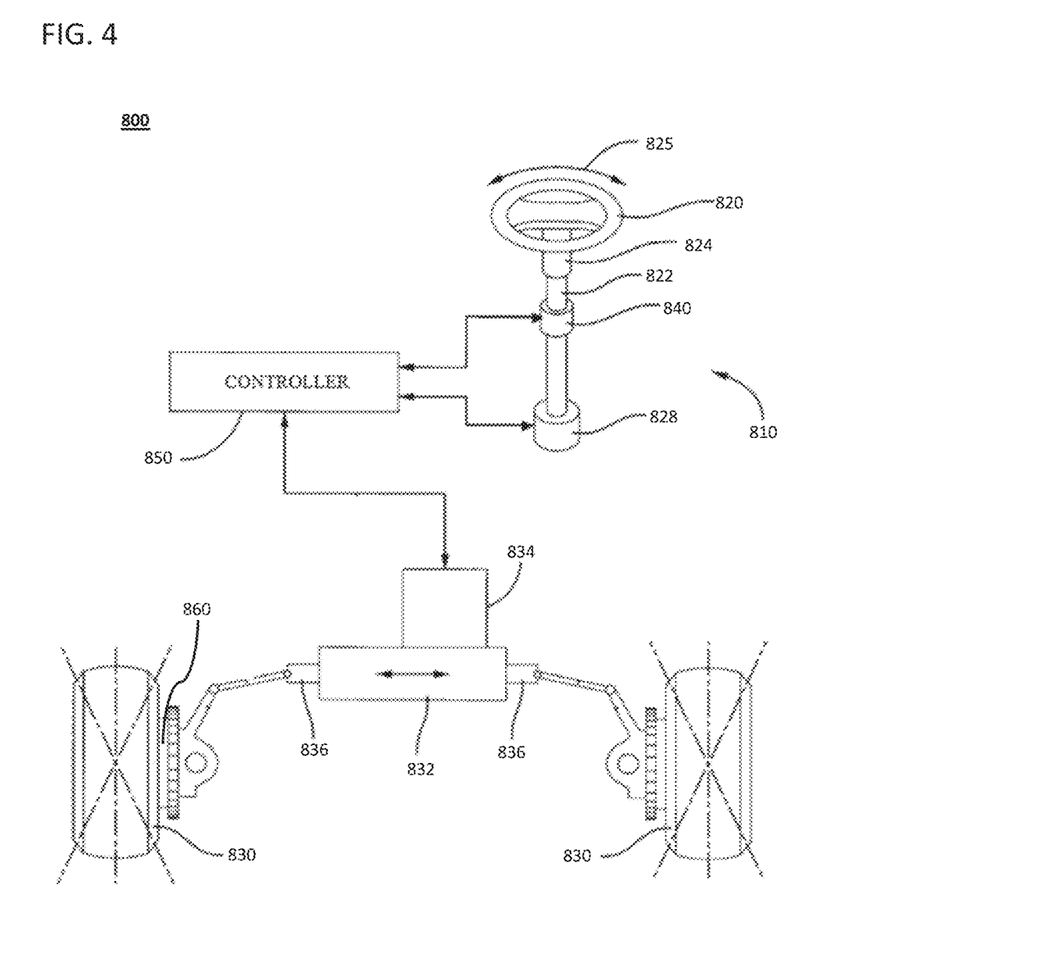
FIG. 4 is a schematic view of a vehicle including a motor control system according to an exemplary embodiment of the present disclosure.

The motor control system of FIG. 1A may be employed in a permanent magnet motor in a vehicle. The vehicle may be any passenger or commercial automobile such as a hybrid vehicle, an electric vehicle, or any other type vehicles. FIG. 4 is a schematic view of a vehicle according to an exemplary embodiment of the present disclosure. A vehicle 800 may include a steering system 810 for use in a vehicle. The steering system 810 can allow a driver or operator of the vehicle 800 to control the direction of the vehicle 800 or road wheels 830 of the vehicle 800 through the manipulation of a steering wheel 820. The steering wheel 820 is operatively coupled to a steering shaft (or steering column) 822. The steering wheel 820 may be directly or indirectly connected with the steering shaft 822. For example, the steering wheel 820 may be connected to the steering shaft 822 through a gear, a shaft, a belt and/or any connection means. The steering shaft 822 may be installed in a housing 824 such that the steering shaft 822 is rotatable within the housing 824.

The road wheels 830 may be connected to knuckles, which are in turn connected to tie rods. The tie rods are connected to a steering assembly 832. The steering assembly 832 may include a steering actuator motor 834 (e.g. the motor 50 described above) and steering rods 836. The steering rods 836 may be operatively coupled to the steering actuator motor 834 such that the steering actuator motor 834 is adapted to move the steering rods 836. The movement of the steering rods 836 controls the direction of the road wheels 830 through the knuckles and tie rods.

One or more sensors 840 may be configured to detect position, angular displacement or travel 825 of the steering shaft 822 or steering wheel 820, as well as detecting the torque of the angular displacement. The sensors 840 provide electric signals to a controller 850 indicative of the angular displacement and torque 825. The controller 850 sends and/or receives signals to/from the steering actuator motor 834 to actuate the steering actuator motor 834 in response to the angular displacement 825 of the steering wheel 820.

In the steer-by-wire steering system, the steering wheel 820 may be mechanically isolated from the road wheels 830. For example, the steer-by-wire system has no mechanical link connecting the steering wheel 825 from the road wheels 830. Accordingly, the steer-by wire steering system may comprise a feedback actuator or steering feel actuator 828 comprising an electric motor (e.g. the motor control system of FIG. 1 described above) which is connected to the steering shaft or steering column 822. The feedback actuator or steering feel actuator 828 provides the driver or operator with the same "road feel" that the driver receives with a direct mechanical link.

Although the embodiment illustrated in FIG. 4 shows the vehicle having the steer-by-wire steering system, The motor control system of FIG. 1 according to exemplary embodiments of the present disclosure can be used in a vehicle having a mechanical steering system. The mechanical steering system typically includes a mechanical linkage or a mechanical connection between the steering wheel 820 and the road wheels 830. In the mechanical steering system, the steering actuator motor 834 includes an electric motor (e.g. the motor control system of FIG. 1 described above) to provide power to assist the movement of the road wheels 830 in response to the operation of the driver or a control signal of the controller 850.

Accordingly, the motor control system of FIG. 1A according to some embodiment of the present disclosure can be used as the steering actuator motor 834 or can be included in the feedback actuator or steering feel actuator 828.

The motor control system of FIG. 1A according to certain embodiments of the present disclosure can be employed in an electromagnetic brake assembly 860. The electromagnetic brake assembly 860 is configured to cause the road wheel 830 to slow or stop motion using electromagnetic force to apply mechanical resistance or friction by using the torque generated by the motor control system of FIG. 1A.

Further, the road wheel 830 may comprise an in-wheel motor mounted in the inner space of the road wheel 830 and configured to drivingly rotate the road wheel 830. The in-wheel motor included the road wheel 830 can include the motor control system of FIG. 1A according to certain embodiments of the present disclosure.

However, the motor control system of FIG. 1A according to some embodiments of the present disclosure are used in any industries such as vehicles, automotive, appliances, aerospace, consumer, medical, industrial automation equipment, instrumentation.

Although the example embodiments have been described in detail, it should be understood that various changes, substitutions and alterations can be made herein without departing from the spirit and scope of the application as defined by the appended claims.

In the present disclosure, relational terms such as first and second, and the like may be used solely to distinguish one entity or action from another entity or action without necessarily requiring or implying any actual such relationship or order between such entities or actions. Furthermore, depending on the context, words such as "connect" or "coupled to"

used in describing a relationship between different elements do not imply that a direct physical connection must be made between these elements. For example, two elements may be connected to each other physically, electronically, logically, or in any other manner, through one or more additional elements. The term "connected" or "coupled" may mean direct or indirect connection unless otherwise specified.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A circuit for a motor having multiple phases including first, second, and third phases, wherein the circuit is electrically connected to a first phase winding and a second phase winding of the motor, the circuit comprising:
   a comparator having first and second inputs; and
   a plurality of resistors connected between the motor and the comparator, the plurality of resistors comprising:
      two or more first parallelly-connected resistors and two or more second parallelly-connected resistors, wherein the first parallelly-connected resistors are connected in series with the second parallelly-connected resistors, and the first parallelly-connected resistors and the second parallelly-connected resistors are connected between the first input of the comparator and the first phase winding of the motor, and
      two or more third parallelly-connected resistors and two or more fourth parallelly-connected resistors, wherein the third parallelly-connected resistors are connected in series with the fourth parallelly-connected resistors, and the third parallelly-connected resistors and the fourth parallelly-connected resistors are connected between the second input of the comparator and the second phase winding of the motor.

2. The circuit according to claim 1, wherein the plurality of resistors connected between the motor and the comparator further comprise two or more fifth parallelly-connected resistors connected in series with the second parallelly-connected resistors and connected in series with the fourth parallelly-connected resistors.

3. The circuit according to claim 2, wherein the two or more fifth parallelly-connected resistors are connected between a first node formed between the first input of the comparator and the two or more second parallelly-connected resistors and a second node formed between the second input of the comparator and the two or more fourth parallelly-connected resistors.

4. The circuit according to claim 2, wherein:
   the first input of the comparator is configured to receive a first voltage, divided from a voltage of the first phase of the motor by the two or more fifth parallelly-connected resistors, and
   the second input of the comparator is configured to receive a second voltage, divided from a voltage of the second phase of the motor by the two or more fifth parallelly-connected resistors.

5. The circuit according to claim 1, wherein the comparator is configured to output a signal indicating a comparison between a first voltage divided from a voltage of the first phase of the motor, and a second voltage divided from a voltage of the second phase of the motor.

6. The circuit according to claim 1, wherein:
   the two or more first parallelly-connected resistors and the two or more second parallelly-connected resistors are configured to limit a current inputted from the first phase winding of the motor, and
   the two or more third parallelly-connected resistors and the two or more fourth parallelly-connected resistors are configured to limit a current inputted from the second phase winding of the motor.

7. The circuit according to claim 1, further comprising a sixth resistor connected to an output of the comparator and configured to pull up a voltage of a signal of the output indicating a comparison between a first voltage divided from a voltage of the first phase of the motor, and a second voltage divided from a voltage of the second phase of the motor.

8. The circuit according to claim 1, further comprising a filter capacitor connected to an output of the comparator and configured to filter out from a voltage of a signal of the output indicating a comparison between a first voltage divided from a voltage of the first phase of the motor, and a second voltage divided from a voltage of the second phase of the motor.

9. The circuit according to claim 2, further comprising:
   a motor position sensor configured to sense a position of the motor; and
   a controller configured to calibrate the position of the motor, sensed by the motor position sensor, based on an output signal of the comparator indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors.

10. The circuit according to claim 2, further comprising:
    a motor position sensor configured to sense a position of the motor; and
    a controller configured to calibrate the position of the motor, sensed by the motor position sensor, based on zero crossing of a voltage difference between the first voltage, divided from a voltage of the first phase of the motor by the two or more fifth parallelly-connected resistors, and the second voltage, divided from a voltage of the second phase of the motor by the two or more fifth parallelly-connected resistors.

11. The circuit according to claim 10, wherein the position of the motor, sensed by the motor position sensor, is calibrated to a point away from the zero crossing of the voltage difference between the first voltage and the second voltage by a preset value.

12. The circuit according to claim 2, wherein the comparator is configured to:
    compare a first voltage, divided from a voltage of the first phase of the motor by the two or more fifth parallelly-connected resistors, and a second voltage, divided from a voltage of the second phase of the motor by the two or more fifth parallelly-connected resistors;
    when the first voltage, divided from the voltage of the first phase of the motor by the two or more fifth parallelly-connected resistors, is greater than the second voltage, divided from the voltage of the second phase of the motor by the two or more fifth parallelly-connected resistors, generate an output voltage having a first level; and when the first voltage, divided from the voltage of the first phase of the motor by the two or more fifth parallelly-connected resistors, is less than the second voltage, divided from the voltage of the second phase of the motor by the two or more fifth parallelly-connected resistors, generate an output voltage having a second level different from the first level.

13. The circuit according to claim 9, further comprising:
a motor position sensor configured to sense a position of the motor; and
a controller configured to calibrate the position of the motor, sensed by the motor position sensor, based on a point of changing an output voltage of the comparator from the first level to the second level, or from the second level to the first level.

14. The circuit according to claim 2, further comprising a controller configured to control the motor or calibrate a position of the motor in response to an output signal of the comparator indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors.

15. A vehicle comprising:
a power source configured to supply power;
a motor having multiple phases including first, second, and third phases;
an electric control unit (ECU) configured to selectively provide the power to one or more of the first, second, and third phases of the motor; and
a circuit electrically connected to a first phase winding and a second phase winding of the motor, the circuit comprising:
a comparator having first and second inputs; and
a plurality of resistors electrically connected between the motor and the comparator, the plurality of resistors comprising:
two or more first parallelly-connected resistors and two or more second parallelly-connected resistors, wherein the first parallelly-connected resistors are connected in series with the second parallelly-connected resistors, and the first parallelly-connected resistors and the second parallelly-connected resistors are connected between the first input of the comparator and the first phase winding of the motor, and
two or more third parallelly-connected resistors and two or more fourth parallelly-connected resistors, wherein the third parallelly-connected resistors are connected in series with the fourth parallelly-connected resistors, and the third parallelly-connected resistors and the fourth parallelly-connected resistors are connected between the second input of the comparator and the second phase winding of the motor.

16. The vehicle according to claim 15, wherein the plurality of resistors connected between the motor and the comparator further comprise two or more fifth parallelly-connected resistors connected in series with the second parallelly-connected resistors and connected in series with the fourth parallelly-connected resistors.

17. The vehicle according to claim 16, further comprising a motor position sensor configured to sense a position or speed of the motor,
wherein the ECU is configured to calibrate the position or speed of the motor, sensed by the motor position sensor, based on an output signal of the comparator indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors.

18. The vehicle according to claim 16, wherein the comparator is configured to output a signal indicating a comparison between a first voltage, divided from a voltage of the first phase of the motor by the two or more fifth parallelly-connected resistors, and a second voltage, divided from a voltage of the second phase of the motor by the two or more fifth parallelly-connected resistors.

19. The vehicle according to claim 16, wherein the comparator is configured to:
compare a first voltage, divided from a voltage of the first phase of the motor by the two or more fifth parallelly-connected resistors, and a second voltage, divided from a voltage of the second phase of the motor by the two or more fifth parallelly-connected resistors;
when the first voltage, divided from the voltage of the first phase of the motor by the two or more fifth parallelly-connected resistors, is greater than the second voltage, divided from the voltage of the second phase of the motor by the two or more fifth parallelly-connected resistors, generate an output voltage having a first level; and
when the first voltage, divided from the voltage of the first phase of the motor by the two or more fifth parallelly-connected resistors, is less than the second voltage, divided from the voltage of the second phase of the motor by the two or more fifth parallelly-connected resistors, generate an output voltage having a second level different from the first level.

20. The vehicle according to claim 19, further comprising a motor position sensor configured to sense a position or speed of the motor,
wherein the ECU is configured to calibrate the position of the motor, sensed by the motor position sensor, based on a point of changing an output voltage of the comparator from the first level to the second level, or from the second level to the first level.

* * * * *